May 15, 1951   C. A. TEA   2,552,823
WATER LEVEL CONTROL DEVICE
Filed Feb. 15, 1946   2 Sheets-Sheet 1

INVENTOR.
Clark A. Tea.
BY
Harness, Dickey & Pierce.
ATTORNEYS.

May 15, 1951  C. A. TEA  2,552,823
WATER LEVEL CONTROL DEVICE
Filed Feb. 15, 1946  2 Sheets-Sheet 2
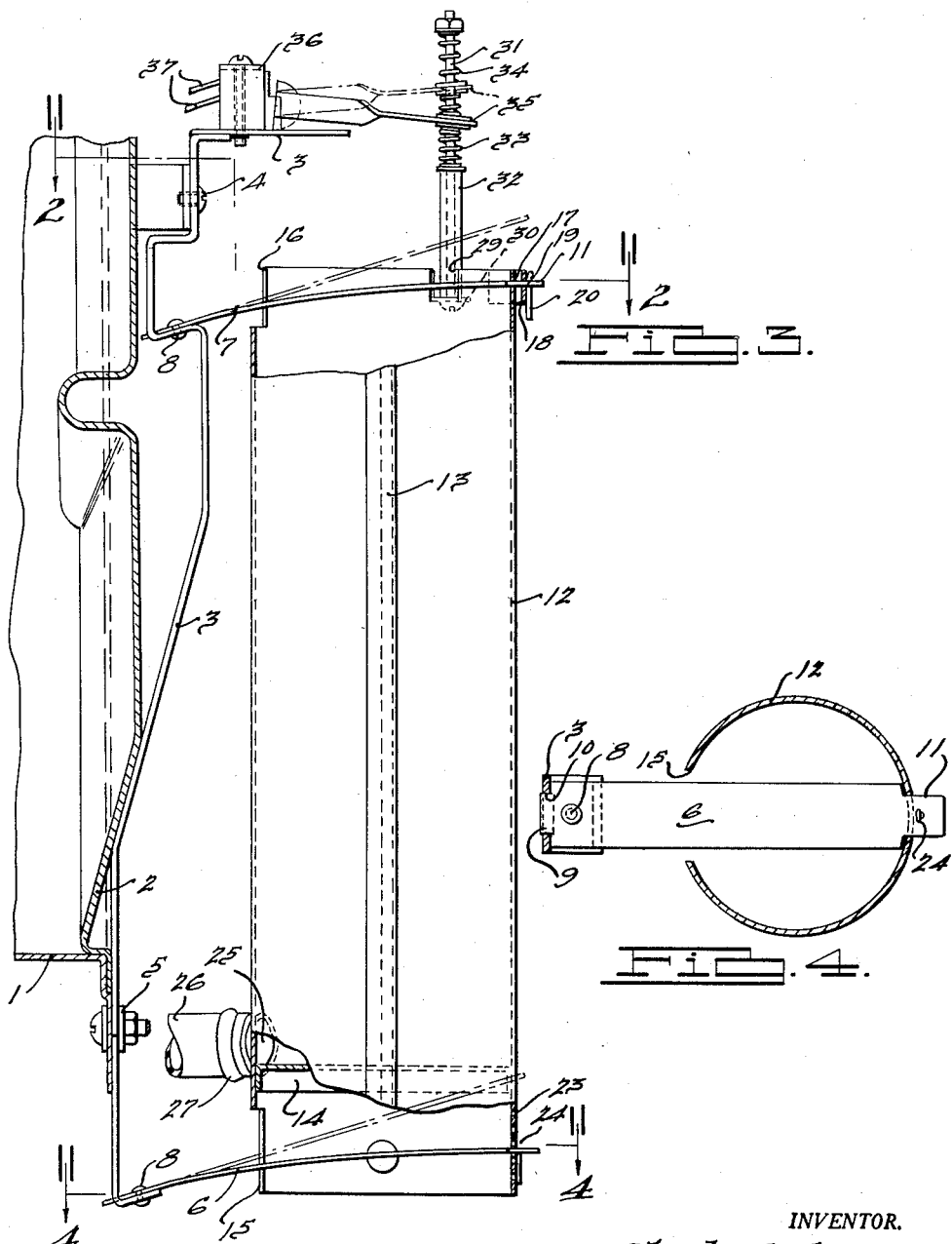
INVENTOR.
Clark A. Tea.
BY
Harness, Dickey & Pierce.
ATTORNEYS.

Patented May 15, 1951

2,552,823

UNITED STATES PATENT OFFICE 2,552,823

WATER LEVEL CONTROL DEVICE

Clark A. Tea, Detroit, Mich., assignor to The Murray Corporation of America, Detroit, Mich., a corporation of Delaware Application February 15, 1946, Serial No. 647,744

5 Claims. (Cl. 200—85)

This invention relates to water level control devices, and particularly to a device having a support for a container which accurately controls the amount of water introduced into a tub or other receiving element.

It is usually the practice in the art to employ a float for controlling the height at which the water will rise within a container and which either operates a valve directly to close off the flow of the water or which actuates a switch to control a circuit to a solenoid valve for closing off the water supply.

The present invention provides a more positive control for the water level device through the weighing of a quantity of water to directly operate a valve or switch for shutting off the flow of water. A container is supported on springs and is conductively joined to the bottom of the tub, the level of the water in which is to be controlled. The container is connected to the operating arm of a switch or valve which it operates when the weight of the water deflects the container sufficiently to operate the valve or switch. As water is introduced into the tub, it will flow into the container at the same time and the height of the water therein will equal the height of the water in the tub. The amount of deflection to the springs for supporting the container is such as to permit the container to deflect a sufficient amount to operate the valve or switch to shut off the flow of water when the water has risen to a predetermined height within the container, the resulting weight of which produces its deflection to the degree required.

The water level device of the present invention is herein shown as applied to a washing machine of the domestic type in which the height of the water is to be accurately controlled so that proper washing and rinsing will result from the operation of the machine. It is to be understood, however, that the device is not limited to this specific application. The container of the device is supported on a pair of leaf springs at the top and bottom which project outwardly from the bracket which is attached to the wall of the washing machine. The leaf spring on the bottom of the container may be secured thereto in different positions so as to regulate the amount the container deflects relative to the height or weight of the water therein. A conduit connects the bottom of the container to the bottom of the tub of the machine so that when water is introduced into the machine it will flow from the bottom thereof into the container maintaining the water height of the container equal to that of the tub. As the water rises within the container while the tub is being filled, the container will deflect due to the increase in the weight of the water until such time as the deflection is sufficient to operate the arm of a valve or switch to close off the flow of water to the tub. When the tub is drained, the water will flow from the container at the same time and will be empty when the tub becomes empty.

Accordingly, the main objects of the invention are: to provide a water level device for controlling the height to which the water rises in a tub through the weight of the water which rises in the container of the device; to provide a water level device embodying a container supported on springs which accurately gauges the deflection of the container in relation to the height of the water therein by which the container will directly operate a valve or switch to shut off the flow of water; to mount a container on a pair of leaf springs adjustable relative thereto to control the amount of deflection produced by the weight of the water rising therein from a conduit connected to the bottom of the tub to be filled to control the height to which the water rises therein; and, in general, to provide a water level control device for a tub or like container which is simple in construction, positive in operation and economical of manufacture.

Other objects and features of the invention will be specifically pointed out or will become apparent when referring, for a better understanding of the invention, to the following description taken in conjunction with the accompanying drawings, wherein:

Fig. 3 is an enlarged sectional view of the structure illustrated in Fig. 1, taken on the line 3—3 thereof, and Fig. 4 is an enlarged sectional view of the structure illustrated in Fig. 3, taken on the line 4—4 thereof.

Figures 1, 2:
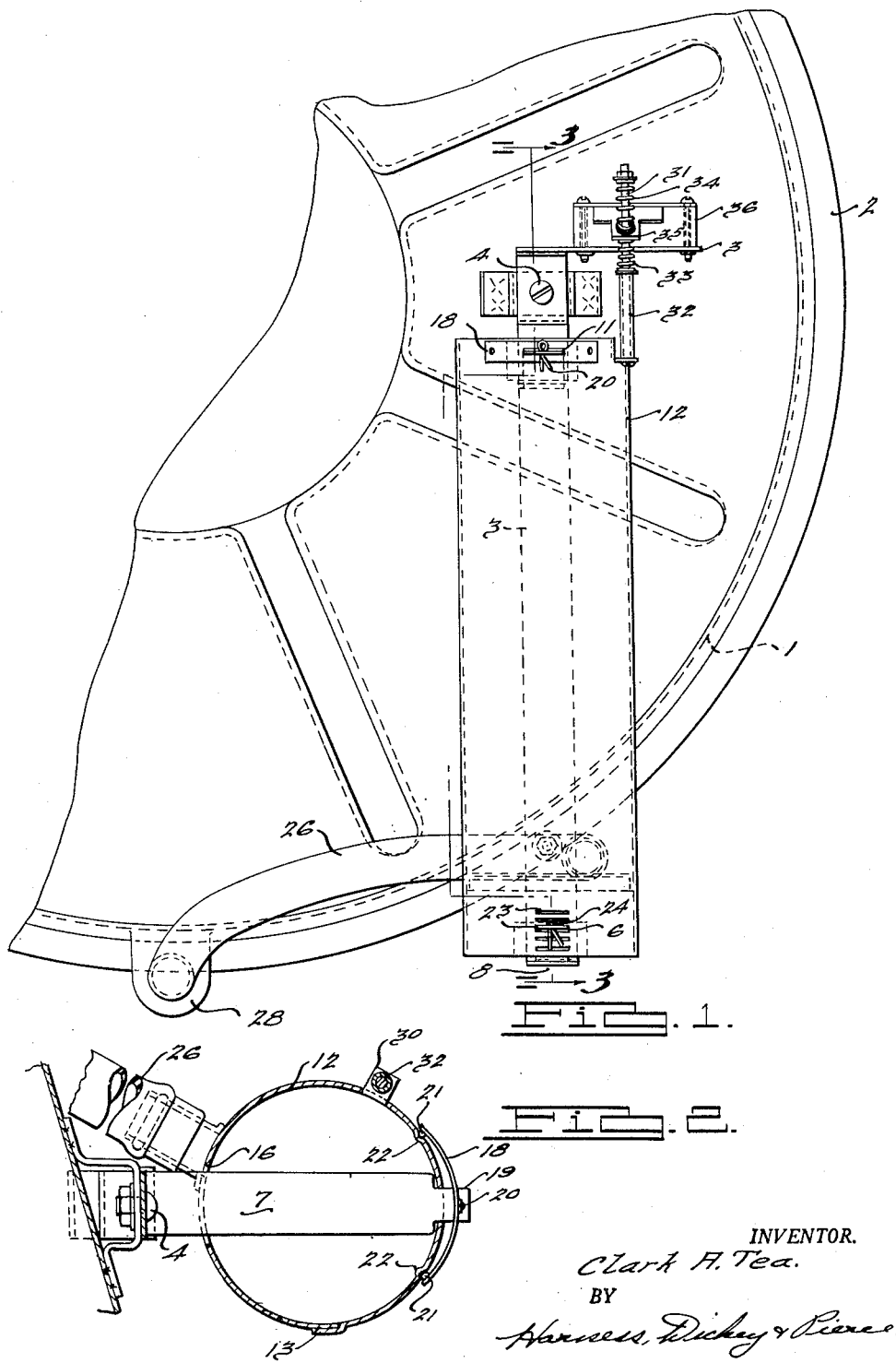
Figure 1 is a broken view in elevation of a washing machine having thereon a water level control device embodying features of this invention.
Fig. 2 is an enlarged sectional view of the structure illustrated in Fig. 1, taken on the line 2—2 of Fig. 3.

Referring to the figures, a washing machine is illustrated embodying a tub 1 having an end wall 2 removably secured thereto. A bracket 3 is attached to the end wall by a screw 4 and a bolt 5. A pair of leaf springs 6 and 7 is secured to the bracket by rivets 8. The leaf springs have a central projecting tab 9 on one end which extends through apertures 10 in the bracket for supporting the leaf springs against lateral displacement about the rivets 8. The forward end of each leaf spring is provided with a longer tab 11 on which the container 12 for operating the switch or valve of the device is supported.

The container 12 is herein illustrated as being of cylindrical form and it is to be understood that the cross-sectional shape of the container could be of any other form such as square, rectangular, oval, and the like. The container is herein illustrated as being formed from a sheet of material which is rolled into a cylinder and welded, brazed, soldered or otherwise secured together along the seam 13. An inverted cuplike element 14 is inserted in the bottom of the cylinder inwardly from the end thereof and is likewise welded, brazed, soldered or otherwise secured in sealed relation thereto. A slot 15 projects inwardly from the cylinder below the bottom 14 and a similar slot 16 extends inwardly from the top edge of the cylinder.

Diametrically opposite to the slot 16 in the cylinder, a slot 17 is provided through the container wall through which the tab 11 of the leaf spring 7 extends. A spring clip 18 is provided with a slot 19 through which the tab 11 extends and is retained in position by a cotter pin 20. The ends of the clip 18 are provided with ball-shaped projections 21 which rest in concave sockets 22 pressed inwardly from the face of the cylinder wall. The spring clip 18 can freely rock in the sockets 22 while stabilizing the container on the leaf spring supports.

The bottom leaf spring 6 has it stab 11 extending through one of a plurality of vertically aligned slots 23 diametrically opposed to the slot 15 in the portion of the cylinder which extends below the bottom 14. A cotter pin 24 retains the container in fixed relation to the leaf spring 6. By adjusting the tab 11 in any one of the slots 23, a preloading of the springs 6 and 7 thereby occurs so that the calibration of the water leveling device may be altered.

An outlet opening 25 is provided in the bottom of the cylinder adjacent to the cuplike element 14 and a smaller tube is welded or otherwise secured about the opening to which a flexible conduit 26 is secured by suitable means herein illustrated as by a ring 27. The conduit 26 is connected into the drain receptacle 28 at the bottom of the tub so that the interior of the container 12 freely communicates with the interior thereof. The length of the flexible conduit 26 and the flexibility thereof are such as to provide no interference with the free deflection of the container when the weight thereof is increased by the addition of the fluid.

The upper part of the container 12 has a notch 29 therein provided by the forming outwardly thereof of a tab 30. A bolt 31 extends through an aperture in the tab having thereon a sleeve 32 and a pair of springs 33 and 34 between which an arm 35 of a switch or valve 36 is secured. The arm 35 is herein illustrated as being secured to a switch 36 secured to an extension on the bracket 3. The switch is connected by conductors 37 to the electrical control circuit of the machine containing the solenoid valve which controls the flow of the fluid into the tub.

In operation, when water is introduced into the tub in the conventional manner, it will flow into the drain receptacle 28 into the conduit 26 from which it will rise in the container 12. The water in the container and in the tub will be at the same level and as this rises in the container, the container will be deflected until the water has risen to such height within the tub that the weight of the water in the container is sufficient to deflect it downwardly an amount to operate the switch 36 to change the circuit connected with the solenoid operated valve to produce the closing of the valve and the shutting off of the flow of water into the tub.

After the water in the washing machine has been employed to wash or rinse clothes, it is drained from the drain receptacle 28, and as the water level within the tub lowers the level of the water within the container 12 lowers therewith and the container is raised by the tension in the leaf springs 6 and 7. When the water has drained entirely from the container 12, it will have risen to its initial position and returned the contacts of the switch 36 to their initial position. As pointed out hereinabove, the arm 35 could directly operate a valve to shut off the flow of water when the water has reached a predetermined height. The switch is connected in a circuit containing the control for connecting the solenoid valve to an energizing circuit. The change of position of the contacts of switch 36 when the container is empty does not thereby connect the solenoid valve to the circuit to produce the flow of the water into the tub but merely sets up the circuit so that the water flow will occur when the control switch of the circuit is thereafter actuated. It is to be understood that when the water is drained from the tub and the operation is continued to produce a wet drying operation on the washed fabrics, the container 12 will be in raised position and the contacts of the switch 36 will be in such position as to set up the circuit for operating the valve while the circuit is retained de-energized by the master control switch since no water is to be introduced into the tub during the wet-drying cycle on the fabrics.

While the level device has been described and illustrated as pertaining to controlling the level of water in a washing machine, it is to be understood that it can be used just as successfully for controlling the flow of any fluid in any kind of a receptacle in which a predetermined height of the fluid is desired.

What is claimed is:

1. A water level height control device for a washing machine including, in combination, a bracket, means for attaching said bracket to said machine, a pair of vertically spaced leaf springs supported on said bracket to extend outwardly therefrom, a container supported on said leaf springs, a conduit for joining the bottom of the container to the bottom of the washing machine, a switch supported on said bracket, and an operating arm on said switch connected to said container to be actuated thereby.

2. A water level height control device for a washing machine including, in combination, a bracket, means for attaching said bracket to said machine, a pair of vertically spaced leaf springs supported on said bracket to extend outwardly therefrom, a container supported on said leaf springs, a conduit for joining the bottom of the container to the bottom of the washing machine, a switch supported on said bracket, an operating arm on said switch connected to said container to be actuated thereby, and means for adjusting the position of one of said leaf springs on said container to change the loading of the leaf spring and the calibration of the device.

3. A water level height control device for a washing machine including, in combination, a bracket, means for attaching said bracket to said machine, a pair of vertically spaced leaf springs supported on said bracket to extend outwardly therefrom, a container supported on said leaf springs, a conduit for joining the bottom of the container to the bottom of the washing machine, a switch supported on said bracket, an operating arm on said switch connected to said container to be actuated thereby, means for adjusting the position of one of said leaf springs on said container to change the loading of the leaf spring and the calibration of the device, and a spring clip secured to the end of the other leaf spring and rockably engaging said container for stabilizing the container while permitting its upward and downward movement.

4. The combination with a water level control device for a washing machine, including, in combination, a bracket, means for attaching the bracket to the machine, means on said bracket for supporting a pair of leaf springs outwardly of the bracket in vertically aligned relation and having extending tabs at the end thereof, a container having a slot at the top for receiving the tab on the top leaf spring and a plurality of slots in vertically aligned relation on the bottom of the container for adjustably receiving the tab on the bottom leaf spring, a switch supported by said bracket, an arm on said switch connected to said container and operated thereby when the container is deflected a predetermined amount, and a conduit extending from said container by which it is connected to the bottom of the washing machine to permit the water being introduced into the machine to rise within the container so that the weight thereof may deflect the container to produce the operation of the switch.

5. The combination with a water level control device for a washing machine, including, in combination, a bracket, means for attaching the bracket to the machine, means on said bracket for supporting a pair of leaf springs outwardly of the bracket in vertically aligned relation and having extending tabs at the end thereof, a container having a slot at the top for receiving the tab on the top leaf spring and a plurality of slots in vertically aligned relation on the bottom of the container for adjustably receiving the tab on the bottom leaf spring, a switch suppotred by said bracket, an arm on said switch connected to said container and operated thereby when the container is deflected a predetermined amount, a conduit extending from said container by which it is connected to the bottom of the washing machine to permit the water being introduced into the machine to rise within the container so that the weight thereof may deflect the container to produce the operation of the switch, and a spring clip having a slot therein to receive the tab of the upper leaf spring and having at each end a rounded projection engageable with concave sockets in the face of the container for stabilizing the container on the leaf springs while permitting the deflection thereof without interference.

CLARK A. TEA.

REFERENCES CITED

The following references are of record in the file of this patent:

UNITED STATES PATENTS

| Number | Name | Date |
| --- | --- | --- |
| 610,913 | Mitchell | Sept. 20, 1898 |
| 1,733,659 | Fulton | Oct. 29, 1929 |
| 2,326,208 | Edwards | Aug. 10, 1943 |